United States Patent
Frenger et al.

(10) Patent No.: US 10,149,212 B2
(45) Date of Patent: Dec. 4, 2018

(54) TRIGGERING PERFORMANCE LEVEL RE-CONFIGURATION IN RADIO BASE STATIONS

(71) Applicant: TELEFONAKTIEBOLAGET LM ERICSSON (PUBL), Stockholm (SE)

(72) Inventors: Pål Frenger, Linköping (SE); Zeid Al-Husseiny, Linköping (SE); Martin Hessler, Linköping (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 57 days.

(21) Appl. No.: 15/308,222

(22) PCT Filed: May 8, 2014

(86) PCT No.: PCT/EP2014/059459
§ 371 (c)(1),
(2) Date: Nov. 1, 2016

(87) PCT Pub. No.: WO2015/169374
PCT Pub. Date: Nov. 12, 2015

(65) Prior Publication Data
US 2017/0070926 A1    Mar. 9, 2017

(51) Int. Cl.
*H04W 36/00* (2009.01)
*H04W 24/02* (2009.01)

(52) U.S. Cl.
CPC ....... *H04W 36/0083* (2013.01); *H04W 24/02* (2013.01)

(58) Field of Classification Search
CPC .......................... H04W 36/0083; H04W 24/02
(Continued)

(56) References Cited

U.S. PATENT DOCUMENTS

2010/0029280 A1* 2/2010 Tenny .................. H04W 36/02
455/436
2010/0208707 A1* 8/2010 Hamabe ................ H04W 24/10
370/332

(Continued)

FOREIGN PATENT DOCUMENTS

| CN | 107135674 A | * | 9/2017 |
| WO | 200065864 A1 | | 11/2000 |
| WO | 2014040270 A1 | | 3/2014 |

OTHER PUBLICATIONS

International Search Report and Written Opinion dated Feb. 25, 2015, in International Application No. PCT/EP2014/059459, 20 pages.

(Continued)

*Primary Examiner* — Phong La
(74) *Attorney, Agent, or Firm* — Rothwell, Figg, Ernst & Manbeck, P.C.

(57) ABSTRACT

A method performed in a network node for triggering a performance level re-configuration in a target radio base station, RBS, prior to handover of a wireless device to the target RBS. The method comprises determining if a need for performance level re-configuration of the target RBS exists, and if need for performance level re-configuration of the target RBS exists, transmitting, to the target RBS, a re-configuration alert message, thereby enabling a performance level re-configuration in the target RBS prior to handover of the wireless device to the target RBS.

11 Claims, 11 Drawing Sheets

(58) Field of Classification Search
USPC .......................................................... 370/331
See application file for complete search history.

(56) References Cited

U.S. PATENT DOCUMENTS

| | | | | |
|---|---|---|---|---|
| 2012/0039181 A1* | 2/2012 | Aziz | ................... | H04W 36/245 370/241 |
| 2013/0039338 A1* | 2/2013 | Suzuki | .............. | H04W 36/0094 370/331 |
| 2013/0114483 A1* | 5/2013 | Suzuki | ................ | H04W 76/048 370/311 |
| 2013/0182563 A1* | 7/2013 | Johansson | ........... | H04W 76/027 370/228 |
| 2013/0201851 A1* | 8/2013 | Chou | .................... | H04W 24/02 370/252 |
| 2014/0024375 A1* | 1/2014 | Fitzpatrick | ........ | H04W 36/0083 455/436 |
| 2014/0211756 A1* | 7/2014 | Bontu | ................... | H04W 36/04 370/331 |
| 2014/0220983 A1* | 8/2014 | Peng | ................. | H04W 36/0072 455/438 |
| 2014/0241317 A1* | 8/2014 | Jamadagni | .......... | H04W 76/025 370/331 |
| 2014/0248840 A1* | 9/2014 | Karri | ..................... | H04W 48/16 455/67.11 |
| 2014/0295820 A1* | 10/2014 | Kim | .................. | H04W 52/0216 455/418 |
| 2014/0301360 A1* | 10/2014 | Bontu | ............... | H04W 36/0083 370/331 |
| 2015/0172988 A1* | 6/2015 | Lai | .................... | H04W 36/0077 455/436 |
| 2015/0223124 A1* | 8/2015 | Wang | .................... | H04W 24/08 455/436 |
| 2015/0223149 A1* | 8/2015 | Liu | ....................... | H04W 48/12 370/252 |
| 2015/0230146 A1* | 8/2015 | Miao | ................. | H04W 36/0066 455/436 |
| 2015/0249972 A1* | 9/2015 | You | ........................ | H04L 5/001 370/254 |
| 2015/0373599 A1* | 12/2015 | Kim | .................. | H04W 36/0083 370/331 |
| 2016/0037426 A1* | 2/2016 | Li | ..................... | H04W 36/0094 370/332 |
| 2016/0105911 A1* | 4/2016 | Kim | .................. | H04W 74/0833 370/329 |
| 2016/0337925 A1* | 11/2016 | Fujishiro | ............... | H04W 16/32 |
| 2017/0272364 A1* | 9/2017 | Ishii | .................... | H04W 76/023 |
| 2017/0318569 A1* | 11/2017 | Dinan | ............... | H04W 72/0406 |

OTHER PUBLICATIONS

ZTE Corporation "Discussion on Small Cell ON/OFF and Discovery", 3GPP TSG-RAN WG2 Meeting #85bis; R2-141377, 3rd Generation Partnership Project (3GPP), Mobile Competence Centre; 650, Route Des Lucioles; F-06921 Sophia-Antipolis Cedex; FRA; Mar. 31, 2014-Apr. 4, 2014 Mar. 22, 2014 (Mar. 22, 2014), XP050792569, Retrieved from the Internet: URL:http://www.3gpp.org/ftp/Meetings_3GPP_SYNC/RAN2/Does, 7 pages.

Samsung "Scenarios and Cell States for Small Cell On/Off and Discovery", 3GPP TSG RAN WG2 Meeting #85bis; R2-141663 DRS Scenarios, 3rd Generation Partnership Project (3GPP), Mobile Competence Centre ; 650, Route Des Lucioles ; F-06921 Sophia-Antipolis Cedex; France, Mar. 31, 2014-Apr. 4, 2014 Mar. 22, 2014 (Mar. 22, 2014), XP050792801, Retrieved from the Internet: URL:http://www.3gpp.org/ftp/Meetings_3GPP_SYNC/RAN2/Docs, 8 pages.

3GPP, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12), 3GPP Standard; 3GPP TS 36.300, V12.1.0, 2014, 241 pages.

Cewit "Transition Time Reduction for Small Cell On/Off", 3GPP TSG RAN WG1 Meeting #76bis, R1-141686 3rd Generation Partnership Project (3GPP), Mobile Competence Centre; 650, Route Des Lucioles; F-06921 Sophia-Antipolis Cedex; FR , Shenzhen, P.R. China; Mar. 31, 2014-Apr. 4, 2014 Mar. 30, 2014 (Mar. 30, 2014), XP050787353, Retrieved from the Internet: URL:http://www.3gpp.org/ftp/Meetings_3GPP_SYNC/RAN1/Docs, 3 pages.

* cited by examiner

TRIGGERING PERFORMANCE LEVEL RE-CONFIGURATION IN RADIO BASE STATIONS

CROSS REFERENCE TO RELATED APPLICATION(S)

This application is a 35 U.S.C. § 371 National Phase Entry Application from PCT/EP2014/059459, filed May 8, 2014, designating the United States, the disclosure of which is incorporated herein in its entirety by reference.

TECHNICAL FIELD

The present disclosure relates to wireless communication networks, and in particular to performance level re-configuration of a radio base station, RBS in a cellular communication network.

BACKGROUND

A cellular communication network is a wireless communication network where one or more wireless devices communicate with one or more radio base stations, RBSs, possibly organized in one or more cells.

Examples of such cellular communication networks include wireless networks implementing global system for mobile communications, GSM, wideband code division multiple access, WCDMA, or long term evolution, LTE, radio access technologies, RATs, or any other RAT defined by, e.g., the 3rd generation partnership project, 3GPP.

Other examples of cellular communication networks include the RATs of the fourth and fifth generation communication systems, 4G, 5G, and also wireless local area networks, WLAN.

The wireless signals transmitted by the one or more RBSs may interference with each other. This interference is herein referred to as inter-cell interference. A large amount of inter-cell interference is undesirable since inter-cell interference generally degrades network performance.

RBSs in general consume significant amounts of power during operation, which power consumption drives the cost of operating a network. Thus, in order to lower operating costs in cellular communication networks, it is often desired to reduce RBS energy consumption.

An RBS which serves no traffic can in some circumstances enter into a dormant mode and thereby reduce both network energy consumption and inter-cell interference. This technique of entering dormant mode is especially interesting for small capacity RBSs which are covered by an umbrella or macro RBS in a heterogeneous network scenario.

When an RBS or cell goes into dormant mode it becomes invisible for the wireless devices in the communication network. Hence it is a quite drastic action to take. Instead of entering dormant mode, an active RBS can take several, less drastic, actions in order to reduce energy consumption and inter-cell interference.

For instance, as an alternative to entering dormant mode, an RBS serving a multi-sector cell can reduce the number of active antennas, going from a multi-sector configuration into a single sector configuration which only uses a single omni-directional antenna.

An RBS can also, instead of entering dormant mode, reduce its signaling bandwidth used for communication with wireless devices and other RBSs, e.g., by replacing an active wide-band cell with a narrow-band cell.

Thus, RBSs can switch between two or more performance level configurations. Herein, the term 'performance' can refer to, for instance, any combination of capacity in terms of traffic throughput, processing delay, transmission delay, data buffering capability, or transmission error rate performance.

However, during switching between different performance level configurations, the performance of an RBS may be temporarily degraded.

For instance, when re-configuring from a single sector antenna mode into a multi-sector mode a handover of wireless devices between the single-sector set-up RBS and the new multi-sector set-up RBS may be necessary. This handover drives signaling overhead and also increases the risk of radio link failure. In case the single-sector cell and the multi-sector cells are active simultaneously during the transition between different levels of performance, the interference level in the network is increased which can temporarily degrade user throughput in the network.

Thus, the performance of an RBS which is switching from a reduced performance level into an increased performance level can actually first decrease below the reduced performance level before increasing up to the new, higher, performance level. A temporary reduction in performance due to performance level re-configuration will herein be referred to as a re-configuration penalty.

Because of this re-configuration penalty, a wireless device entering a cell having a reduced performance level, and wherein the wireless device requires a higher service level than presently offered in the cell, may initially experience worsened conditions as the RBS performance level is re-configured from the reduced level into a higher performance level.

SUMMARY

An object of the present disclosure is to provide methods and network elements which seek to mitigate, alleviate, or eliminate one or more of the above-identified deficiencies in the art and disadvantages singly or in any combination and to provide improved mechanisms for performance level re-configuration of a target RBS in order to reduce the effects of the re-configuration penalty on wireless devices.

This object is obtained by a method performed in a network node for triggering a performance level re-configuration in a target radio base station, RBS, prior to handover of a wireless device to the target RBS. The method comprises determining if a need for performance level re-configuration of the target RBS exists, and if need for performance level re-configuration of the target RBS exists, transmitting a re-configuration alert message to the target RBS, thereby enabling a performance level re-configuration in the target RBS prior to handover of the wireless device to the target RBS.

In this way a re-configuration routine for increasing the performance level of the target RBS in terms of, e.g., traffic throughput, processing delay, or transmission error rate performance, is started and in most cases even completed prior to an actual handover of the wireless device to the target RBS. Thus, the impact on the wireless device of any temporary performance reduction associated with the performance level re-configuration routine, i.e., re-configuration penalty, is reduced.

Thus, by the present teaching, network energy consumption and inter-cell interference in cellular communication networks are reduced, while avoiding the above-mentioned drawbacks associated with RBSs entering dormant mode.

According to some aspects, the step of determining comprises evaluating if a probability of handover of the wireless device to the target RBS occurring during a pre-determined re-configuration time duration exceeds a pre-determined probability threshold. The transmitting is then executed if the probability of handover during the pre-determined re-configuration time duration exceeds the probability threshold.

Thus, there is provided a mechanism which enables triggering performance level re-configuration of the target RBS based on if there is a high enough probability that the wireless device is likely to be handed over to the target RBS within the pre-determined re-configuration time duration. This time duration is, according to some aspects, set as a function of the time under which the re-configuration penalty is in effect. In this way, timely performance level re-configuration is performed, and the number of unnecessary performance level re-configurations is reduced since re-configuration is only triggered in case of a high enough probability of imminent handover of the wireless device to the target RBS.

According to some further aspects, the disclosed method comprises receiving, from the wireless device, at least one parameter related to the target RBS indicating that the target RBS is a handover candidate of the wireless device. The determining if a need for performance level re-configuration of the target RBS exists is then based on the received at least one parameter.

This interaction with the wireless device enables a further refinement of the time instant in which said transmitting is executed, and thus also enables a further refinement or optimization of the time instant in which re-configuration is triggered.

The object is also obtained by a method, performed in a target RBS for triggering a performance level re-configuration of the target RBS. The method comprises receiving, from a network node, a re-configuration alert message, and also executing a re-configuration of the target RBS to a higher performance level based on the received re-configuration alert message.

Thus, there is provided a method performed in a target RBS for interacting with said network node. Thereby, the same advantages and benefits are obtained as for the method performed in the network node discussed above.

There is also disclosed herein a network node adapted to trigger re-configuration of the performance level of a target RBS prior to handover of a wireless device to the target RBS. The network node comprises a processor configured to determine if a need for performance level re-configuration in the target RBS exists, an alert message generator unit configured to, if a need for performance level re-configuration in the target RBS, exists, generate a re-configuration alert message, and also a communication interface configured to transmit the re-configuration alert message to the target RBS, thereby triggering re-configuration of the performance level of the target RBS.

There is further disclosed herein a target RBS, supporting performance level re-configuration. The target RBS comprises a communication interface configured to receive, from a network node, a re-configuration alert message, and also an RBS re-configuration unit configured to trigger a performance level re-configuration to a higher performance level of the target RBS based on the received re-configuration alert message.

There is furthermore disclosed herein a wireless device configured for supporting performance level re-configuration of a target RBS. The wireless device comprises a parameter determining unit configured to determine at least one parameter related to the target RBS indicating if the target RBS is a handover candidate for the wireless device. The wireless device also comprises a communications interface adapted to transmit the at least one parameter to a network node at a first time instant, earlier than a corresponding time instant of a regular handover routine.

In addition, there are provided herein computer programs, comprising computer readable code which, when run on an apparatus, causes the apparatus to perform any of the methods disclosed herein.

The computer programs, the network node, the target RBS, and the wireless device all display advantages corresponding to the advantages already described in relation to the respective methods disclosed above.

BRIEF DESCRIPTION OF THE DRAWINGS

Further objects, features, and advantages of the present disclosure will appear from the following detailed description, wherein some aspects of the disclosure will be described in more detail with reference to the accompanying drawings, in which.

DETAILED DESCRIPTION

Figure 1:
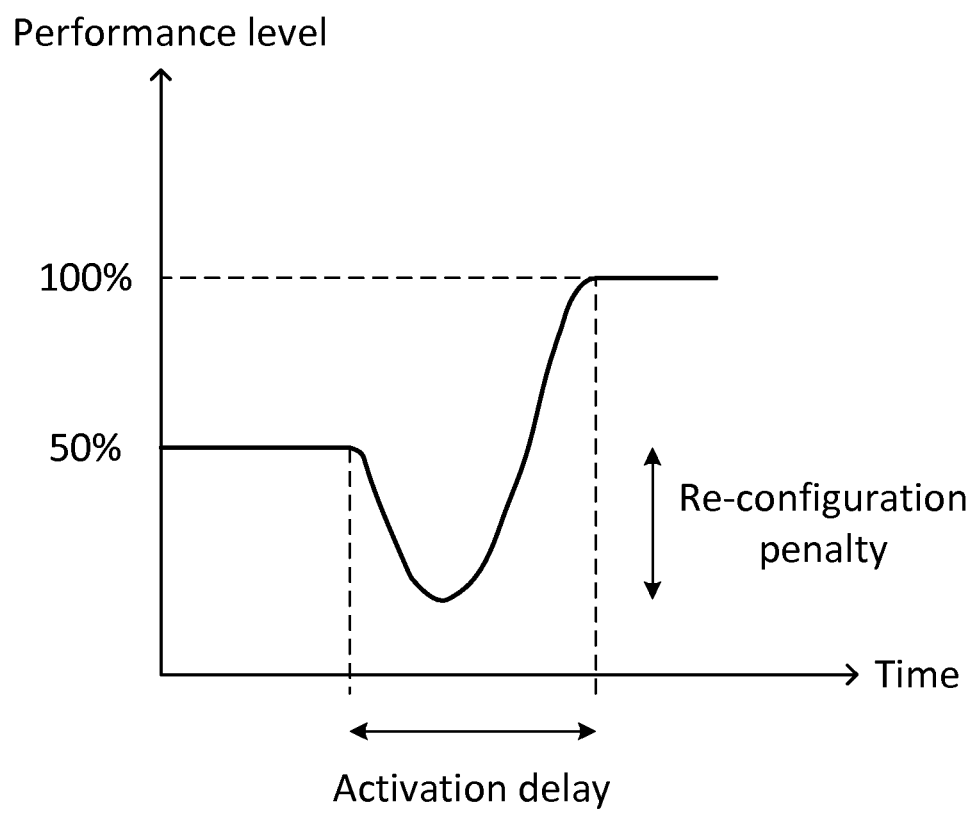
FIG. 1 is a graph of cell performance as function of time.

Aspects of the present disclosure will be described more fully hereinafter with reference to the accompanying drawings. The apparatus, computer program and methods disclosed herein can, however, be realized in many different forms and should not be construed as being limited to the aspects set forth herein. Like numbers in the drawings refer to like elements throughout, except for a prefix digit in the number which represents the figure in which the element is to be found.

The terminology used herein is for the purpose of describing particular aspects of the disclosure only, and is not intended to limit the invention. As used herein, the singular forms "a", "an" and "the" are intended to include the plural forms as well, unless the context clearly indicates otherwise.

As mentioned above, during switching between performance level configurations of a target radio base station, RBS, the performance level of the target RBS is often temporarily deteriorated, an effect which is referred to herein as a re-configuration penalty. A wireless device entering a cell with reduced performance and requiring a higher service level may as a consequence of said re-configuration penalty first experience worsened conditions during a time window while the RBS activates an increased performance level configuration, before experiencing an improvement in performance level corresponding to the increased performance level configuration.

FIG. 1 shows a graph of cell performance as function of time when an RBS is being re-configured from a reduced performance level mode of operation into an increased performance level mode of operation. Herein, as mentioned above, RBS performance comprises any of, e.g., traffic throughput, processing delay, or transmission error rate performance.

Changing the performance level of an RBS can be achieved in many different ways. Examples of such procedures are described below:

Varying antenna port merging and power amplifier, PA, muting. By adding the physical signals that are directed towards the antennas and transmitting the sum-signal from a single antenna using a single PA it is possible to turn off all PAs but one in a cell.

Multiple-Input multiple-output, MIMO, adaptation. That is, replacing a 2 or 4 transmit, TX, antenna cell with a single TX antenna cell. Instead of merging antenna ports and de-activating PAs that are not needed, an alternative is to close down the old MIMO capable cell and start up a new non-MIMO capable cell. The advantage is that the idle mode performance is slightly better and that only one reference signal port needs to be transmitted instead of two.

Sector-to-omni re-configuration. A base station that has several sector cells may de-activate all of them and replace them with a single omnidirectional cell. For a MIMO capable 3-sector base station it is then possible to reduce the number of active PAs from 6 down to 1.

Changing multicast broadcast single frequency network, MBSFN, configuration. In long term evolution, LTE, up to 6 out of 10 sub-frames can be defined as MBSFN sub-frames. Since the MBSFN sub-frames do not contain as many cell specific reference symbols as normal sub-frames do, this method reduces the amount of mandatory idle mode signals that a base station needs to transmit.

Adapting the bandwidth used for communication in a cell. For instance, it is possible to replace an LTE active wide-band cell with a narrow band cell. By reducing the bandwidth a radio base station, RBS, needs to transmit less reference signal power.

Hardware utilization. By using fewer processing modules, e.g., antenna elements or central processing unit, CPU, cores, for a given task, less power is needed in such a reduced performance mode. This is of particular interest in centralized radio access networks, CRAN, scenarios where base-band processing for several cells is shared in a large resource pool.

Sector to omni reconfiguration is sometimes considered as a slow energy saving method that operates on a time scale of approximately 12 hours. Typically a site is configured for omni-coverage during night time and sector coverage during day time. However, there are no fundamental reasons why sector-omni-reconfiguration cannot be performed much faster, e.g. on a sub-second time scale. Antenna merging is considered to be a much faster energy saving method applicable on e.g. a timescale of seconds.

As mentioned above, and also illustrated in FIG. 1, there is often a re-configuration penalty associated with switching between performance modes. Some possible reasons for this re-configuration penalty are given below:

Changing multicast broadcast single frequency network, MBSFN, configuration. Removing MBSFN sub-frames in LTE and turning them into normal sub-frames requires system information to be changed. This takes time and during that time the user throughput is limited. When the MBSFN sub-frames are used again neighboring cells may experience a sudden change in inter-cell interference level. This interference degrades cell throughput and link adaptation accuracy, and is therefore likely to cause re-transmissions in the network.

Bandwidth adaptation. Changing the bandwidth of a cell is in many cellular networks, such as networks based on LTE, not practically possible. Instead a new cell needs to be created and the active wireless devices, or user equipments, need to perform a handover. Temporarily the user throughput is then limited, the interference is higher than necessary, and there is an increased risk of radio link failures. Moreover, the inter-cell interference changes suddenly and this may cause negative effects in neighboring cells.

Varying antenna port merging and power amplifier, PA, muting. When de-muting an antenna port the channel estimates made by wireless devices in, e.g., an LTE network, are disturbed. This affects demodulation performance of the wireless devices. Also, rank estimation and pre-coder selection in LTE networks are disturbed, which causes degraded quality in channel quality feedback reports.

Sector-to-omni re-configuration. When re-configuring from omni-to-sector coverage, it is often necessary to perform a handover which drives signaling overhead and increases the risk of radio link failure. In case the omni-cell and the sector cells are active simultaneously during the transition the interference level is increased which temporarily degrades the user throughput. Also if inter-cell-interference is suddenly increased then this may cause troubles in neighboring cells with link adaptation accuracy and reduced throughput.

Carrier aggregation. In order for a wireless device to be able to use an additional carrier it needs to be active a short while in advance. For example, the wireless device needs to be able to create a stable channel estimation of the new carrier in order to demodulate control channels. Some tenth of milliseconds is typically required before the new carrier can be fully utilized. Also, when activating a new carrier inter-cell interference suddenly changes, which generally causes negative effects in the system.

Figure 2:
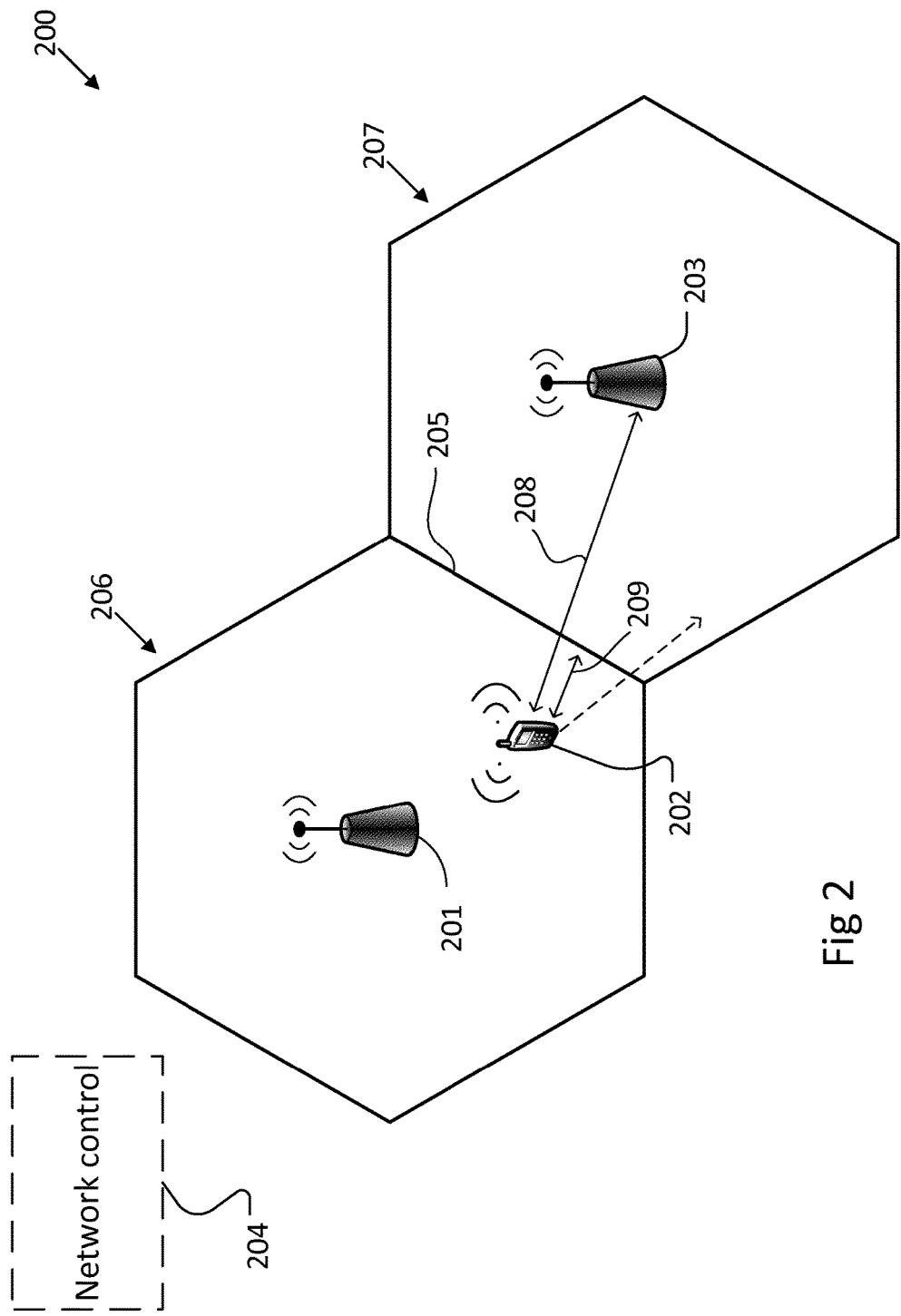
FIG. 2 is a schematic illustration of a radio network.

FIG. 2 shows a schematic illustration of a radio network 200, comprising a network control entity 204, where the present teaching is implemented in order to improve on the mechanisms for performance level re-configuration of RBSs and thus reduce the effects of the re-configuration penalty on wireless devices.

The wireless device 202 shown in FIG. 2 is served by a serving RBS 201 and located in a cell 206 of the serving RBS 201. The wireless device 202 is approaching the cell border 205 between the cell 206 of the serving RBS 201 and a cell 207 of a target RBS 203. The direction of movement of the wireless device 202 is shown in FIG. 2 by a dashed line. Thus, since the wireless device 202 approaches the target RBS 203, an imminent handover of the wireless device 202 from the serving RBS 201 to the target RBS 203 is likely.

A first distance value 208 indicates a geographical distance between the wireless device 202 and the target RBS 203.

A second distance value 209 indicates a geographical distance between the wireless device 202 and said cell border 205.

Now, suppose that the target RBS 203 is currently operating in a reduced performance mode, and that the wireless device 202 requests, or even demands, service at an increased performance level compared to that presently offered by the target RBS 203. This situation indicates that there is a need to re-configure the performance level of the target RBS 203 in order to properly service the approaching wireless device 202. However, as has been discussed above, it is desirable to avoid inflicting a re-configuration penalty on the wireless device 202.

Figure 3:
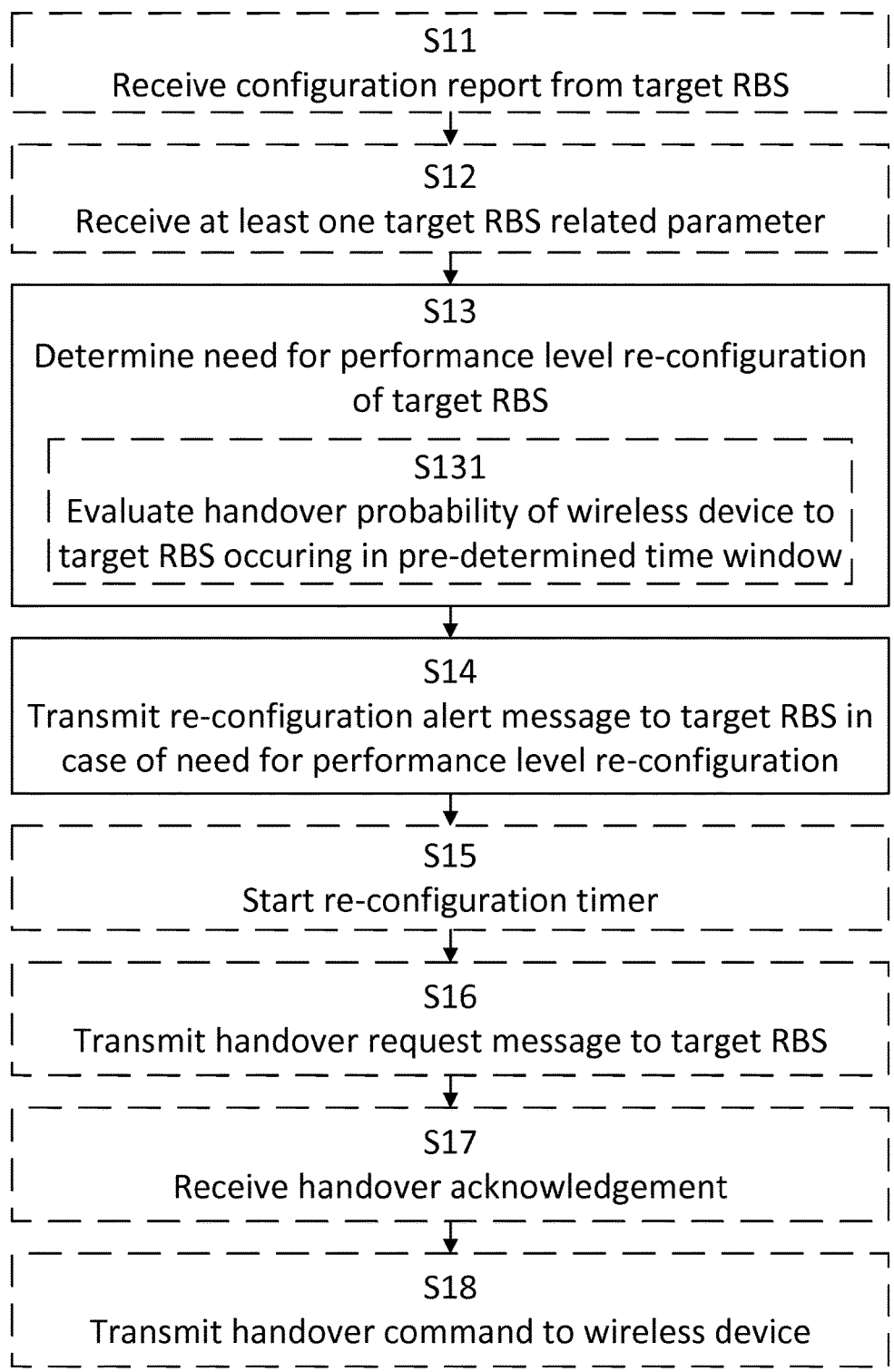
FIGS. 3-5 are flowcharts illustrating embodiments of method steps.

FIG. 3 shows a flowchart illustrating embodiments of method steps directed towards avoiding inflicting said re-configuration penalty on the wireless device 202 as it is handed over to the target RBS 203. In particular, FIG. 3 shows a method performed in a network node for triggering a performance level re-configuration in a target RBS 203 prior to handover of a wireless device 202 to the target RBS 203. Thus, with reference to FIG. 2, the method is directed towards triggering a performance level re-configuration in the target RBS 203 such that the re-configuration penalty shown in FIG. 1 has already lapsed, or at least is about to lapse, before the wireless device 202 is handed over from the serving RBS 201 to the target RBS 203. In this way, the impact on the wireless device 202 by the re-configuration penalty, discussed above, is reduced or even eliminated.

According to some aspects, the network node is the serving RBS 201 of the wireless device 202.

According to some other aspects, the network node is a central network control entity 204 of the radio network 200 comprising the wireless device 202, the target RBS 203, and the serving RBS 201 of the wireless device 202.

According to some further aspects, the network node is a module comprised in the wireless device 202 itself.

It is further noted that, according to some aspects, there is no need for the wireless device 202 to support in the executing of the present method. This means that the present teaching, according to some aspects, is applied in a communication system without any required changes to the wireless devices in the communication system, i.e., the present technique is compatible with legacy wireless devices.

The method shown in FIG. 3 comprises determining S13 if a need for performance level re-configuration of the target RBS 203 exists. This determining S13 is according to different aspects executed in different ways, and more details pertaining to said determining will be given below. However, in general, the determining S13 aims at estimating or otherwise, in some way, determine when a need for increased performance level in the target RBS 203 is needed, or is about to be needed.

One example of determining if a need for performance level re-configuration of the target RBS 203 exists is when there is a wireless device, such as the wireless device 202 shown in FIG. 2, which is moving in a way that makes an imminent handover to the target RBS likely.

Another example is a scenario where a wireless device is powered up in the cell of the target RBS, and the time instant for this powering up is possible to predict, or is otherwise known a-priori, by the network node. The powering up can for instance be periodical. In this case there is a need for increased performance level in the target RBS 203 starting at a suitable time instant prior to the time instant of powering up.

Yet another example is to keep all neighboring RBSs of, e.g., a serving RBS at a given performance level during time periods when the serving RBS is serving one or more wireless devices, since there is then a possibility of handover occurring from the serving RBS to one of the neighboring RBSs. That is, a need for increased performance level in the target RBS 203 is defined to exist if a neighboring RBS of the target RBS, such as the serving RBS, is presently serving one or more wireless devices.

If need for performance level re-configuration of the target RBS 203 exists, the method further comprises transmitting S14, to the target RBS 203, a re-configuration alert message, thereby enabling a performance level re-configuration in the target RBS 203 prior to handover of the wireless device 202 to the target RBS 203.

In the re-configuration alert message from the network node to the target RBS, it is possible to include information pertaining to the type of capability, or performance level, that is required by the wireless device. In this way, according to aspects, the target RBS determines if its currently configured performance level is sufficient to service the wireless device, or if an increased performance level is needed.

Also, different wireless devices are handled differently according to aspects of the present teaching. A wireless device requiring a high data rate service triggers transmission of a re-configuration alert message earlier than a low data rate wireless device.

Consequently, according to some aspects, a serving RBS such as the serving RBS 201 shown in FIG. 2 only transmits the re-configuration alert message to the target RBS 203 in case the wireless device 202 to be handed over to the target RBS 203 has a service requirement that will be noticeably degraded by the present performance level capacity and activation delay in the target RBS, or if a subscription of the wireless device 202 indicates that the performance of this particular wireless device shall be prioritized.

The above-identified deficiencies in the art and disadvantages are thus avoided or at least alleviated. User performance is not degraded, at least to the same extent, due to performance level changes of RBSs. Since the cost of changing performance level, i.e., the impact of the re-configuration penalty, is reduced, it becomes possible to be more aggressive in performance level control algorithms and thereby the positive effects of the present teaching are further enhanced, i.e., even further reductions of energy consumption and inter-cell interference are possible.

According to some aspects, the determining S13 comprises evaluating S131 if a probability of handover of the wireless device 202 to the target RBS 203 occurring during a pre-determined re-configuration time duration exceeds a pre-determined probability threshold. In this case, the transmitting S14 is executed if the probability of handover during the pre-determined re-configuration time duration exceeds the probability threshold.

This evaluating of a probability of handover of the wireless device 202 to the target RBS 203 is according to different aspects of the present disclosure performed in different ways, some of which will be discussed below.

Examples of the evaluating of a probability of handover involve interaction with the wireless device, i.e., the evaluating of a probability of handover is based on measurements received from the wireless device.

Other examples of the evaluating of a probability of handover do not involve any specific interaction with the wireless device at all. For instance, the probability is according to some aspects evaluated solely based on past activity patterns of the wireless device, such as past motion patterns, of a given wireless device. According to other aspects there is a-priori information available to the network node about times at which the wireless device will be powered up, in which case the re-configuration alert message transmission time is pre-computed.

As mentioned above, the wireless device 202 is in some cases partaking in the disclosed methods. For instance, according to some aspects, the method further comprises receiving S12, from the wireless device 202, at least one parameter related to the target RBS 203 indicating that the target RBS is a handover candidate of the wireless device 202. The determining S13 if a need for performance level re-configuration of the target RBS 203 exists is then, at least partly, based on the received at least one parameter.

The at least one parameter related to the target RBS 203, according to aspects, comprises any of:

A reference signal received power, RSRP, value indicating a quality of a radio link between the wireless device 202 and the target RBS 203, and/or a reference signal received quality, RSRQ, value indicating a quality of a radio link between the wireless device 202 and the target RBS 203.

A first distance value 208 indicating a geographical distance between the wireless device 202 and the target RBS 203.

A second distance value 209 indicating a geographical distance between the wireless device 202 and a cell border 205 between a cell 206 of a serving RBS 201 of the wireless device and a cell 207 of the target RBS 203.

The RSRP and RSRQ values are used to determine radio link quality with respect to the target RBS, and therefore also how likely a handover of the wireless device 202 to the target RBS 203 is. Thus, the evaluating S131 according to aspects comprises comparing the RSRP value or the RSRQ value to a respective pre-determined RSRP or RSRQ threshold, and deciding that the probability of handover exceeds the pre-determined probability threshold based on if the RSRP value or the RSRQ value exceeds the respective RSRP or RSRQ threshold.

Further, the rate of change of these RSRP and RSRQ values is, according to some aspects, used to judge how fast the wireless device 202 is approaching the target RBS 203, and therefore also how close in time a handover is likely to be.

Furthermore, the rate of change of the first 208 and/or second 209 distance value is, according to some aspects, used to judge how fast the wireless device 202 is approaching the target RBS 203, and therefore also how close in time a handover is likely to be.

According to some aspects, neighbor cell reporting thresholds for RSRQ and/or RSRP is adjusted so that wireless devices report handover candidate RBSs before a handover reporting threshold is reached. RSRP measurements for inter-cell-interference coordination and avoidance are according to some aspects used for this purpose.

Furthermore, the wireless devices are, according to aspects, configured to send a positioning report in case it moves close to the cell border. Alternatively, periodic positioning reports from the wireless device are configured, or a network node located in the serving RBS 201 or elsewhere may position the wireless device and inform the serving RBS 201 when it is time to send the re-configuration alert message to the target RBS.

A similar situation holds for the first and the second distance values. Thus, the evaluating S131 according to aspects further comprises comparing the first distance value 208 or the second distance value 209 to a respective pre-determined first distance threshold or second distance threshold, respectively, and deciding that the probability of handover exceeds the pre-determined probability threshold based on if the first distance value 208 or the second distance value 209 is below the respective threshold.

The method further, according to aspects, comprises receiving S11, from the target RBS 203, a configuration report indicating a present performance level configuration of the target RBS 203. In this way, the network node is informed about the present performance level configuration of the target RBS 203. The transmitting S14 then further comprises transmitting, to the target RBS 203, the re-configuration alert message if the target RBS is operating below a maximum performance level. This brings an additional benefit of reducing the number of transmissions of the re-configuration alert message, for instance since no re-configuration alert message need to be transmitted to target RBSs which are already operating at maximum performance level or at least at a sufficiently high performance level.

An active RBS thus, according to aspects, reports its current performance level to neighboring RBSs in a configuration report. This report is according to some aspects expressed as a percentage of the peak performance of the target RBS together with an activation delay for reaching maximum performance. For, e.g., antenna muting, the current performance level can be expressed, e.g., as 50% and 100 ms for a target RBS which is operating at 50% antenna performance and which estimates that it will take 100 ms to reach full antenna performance.

Sometimes it is not necessary for a wireless device to use 100% of the target RBS 203 capacity. But the reported activity level (e.g. 50%) may not be enough for servicing the wireless device 202. The network node, according to aspects, then uses information from the target RBS concerning the activation delay required to achieve a certain service level (e.g., 75% of maximum performance is possible within 10 ms). According to some aspects the configuration report is used to distribute this type of information to the network node. The information in the configuration report is then preconfigured or signaled between cells.

The timing of when the network node, which according to aspects constitutes the serving RBS, sends the re-configuration alert message to the candidate target RBS is, according to some aspects, determined by the reported activation delay. The reported delay is then used to calculate an activity alert advance time duration. The activation delay according to some aspects also influences the setting of neighboring cell reporting threshold levels in the wireless devices to enable getting target cell measurement reports in sufficient advance to enable a sufficient activity alert advance timer value to be used.

A target RBS receiving a re-configuration alert message will according to some aspects use the re-configuration alert message as trigger to start switching performance level configuration. However, it should be understood that in some cases the target RBS has already changed performance level due to, for example, another re-configuration alert message and therefore does not change performance level due to all received re-configuration alert messages.

The present teaching also encompasses aspects where the target RBS 203 is configured to make an informed decision on whether to initialize a routine for increasing its performance level, or whether to refrain from starting such a routine. Towards this end, according to different aspects, the re-configuration alert message comprises any of:

A required throughput of the wireless device 202.

A required maximum transmission delay of the wireless device 202.

A required priority of the wireless device 202.

A required maximum transmission error rate of the wireless device 202.

The target RBS 203 is according to such aspects then configured to compare its current performance level to that which is required or requested by the wireless device 202 likely to be handed over to the target RBS 203. Based on the result of this comparison the target RBS 203 then makes a decision on whether to initialize a performance level re-configuration or whether to refrain from such initialization. Furthermore, the target RBS 203, depending on scenario, may not need to execute a performance level re-configuration up to a maximum performance level, but an intermediate performance level could be enough in order to provide adequate service to the wireless device 202 in question. In such cases the target RBS is, according to some aspects, configured to choose an intermediate performance level which meets requirements and not always switch to a maximum performance level during the re-configuration routine.

In the case discussed above where the network node is in fact the serving RBS 201, the network node, i.e., the serving RBS, is likely to assume the role of a target RBS in future signaling, while the target RBS is likely to assume the role of the network node at some future time. Thus, it makes sense for the serving RBS to inform the target RBS about which performance level that the serving RBS will have upon handover completion. This performance level is, according to aspects, the current performance level or a future planned performance level following a planned performance level re-configuration.

Thus, according to aspects, the re-configuration alert message comprises a configuration report of the serving RBS 201 of the wireless device 202 indicating a performance level of the serving RBS 201 upon handover completion of the wireless device to the target RBS.

According to some aspects, the serving RBS 201 knows a-priori that it will reduce its performance level, or performance level configuration, following handover of the wireless device 202 to the target RBS 203, and in that case such information is communicated to the target RBS 203 already in the re-configuration alert message or, alternatively, in the handover request message sent from the serving RBS 201 to the target RBS 203.

According to some further aspects, the target RBS 203 includes this information in the process of deciding whether to accept the handover of the wireless device or not. For example, this information enables consideration of the total network energy consumption to be included when evaluating the handover request. The expected additional energy cost in the target RBS 203 is weighed against the expected energy decrease in the serving RBS 201. In general, since a base station may have several different performance modes or performance levels and since it might not always be necessary to step up to the maximum performance level whenever there is traffic in the cell, a suitable performance level is decided based on a combination of information from the serving RBS 201 and from the target RBS 203.

In a network, where cells change performance level up and down as wireless devices are handed over back and forth, the negative impacts of ping-pong handover are often more severe than otherwise when using the present technique. Hence the normal ping-pong avoidance mechanisms, involving functions such as hysteresis and timers, are according to aspects made more stringent when the present technique is implemented in a network.

In case a target RBS 203 receives two independent re-configuration alert messages during the same time window from two different RBS, a solution for arbitration between the two independent re-configuration alert messages is to add the two requested performance levels together into one message. E.g. one alert of 25% requested activity and another of 50% requested activity results in a decision to re-configure into 75% activity. Alternatively, the two activity alert levels are combined in another way, e.g., as a function such as taking the maximum or computing a linear combination involving both re-configuration alert messages.

In case the network node is in control of the actual handover of the wireless device 202 to the target RBS 203, the network node, according to aspects, defers handover until the target RBS has had enough time to complete performance level re-configuration. Towards this end, the method, according to aspects, comprises starting S15 a re-configuration timer corresponding to a re-configuration time duration of the target RBS 203. The method then also comprises transmitting S16, to the target RBS 203, a handover request message for handover of the wireless device 202 to the target RBS 203, following expiration of the re-configuration timer.

Thus, completion of the performance level re-configuration prior to handover is in some cases guaranteed, which means that the negative effects of the re-configuration penalty is avoided in entirety.

Upon receiving S17 a handover acknowledgement from the target RBS 203, the method according to aspects comprises transmitting S18 a handover command to the wireless device for handover to the target RBS 203. Thus, actual handover of the wireless device is actuated by the network node.

Similar to the case where a configuration report of the serving RBS 201 is appended to the re-configuration alert message, said handover request message, according to aspects, comprises a configuration report of the serving RBS 201 of the wireless device 202 indicating a performance level of the serving RBS 201 upon handover completion.

Figure 4:
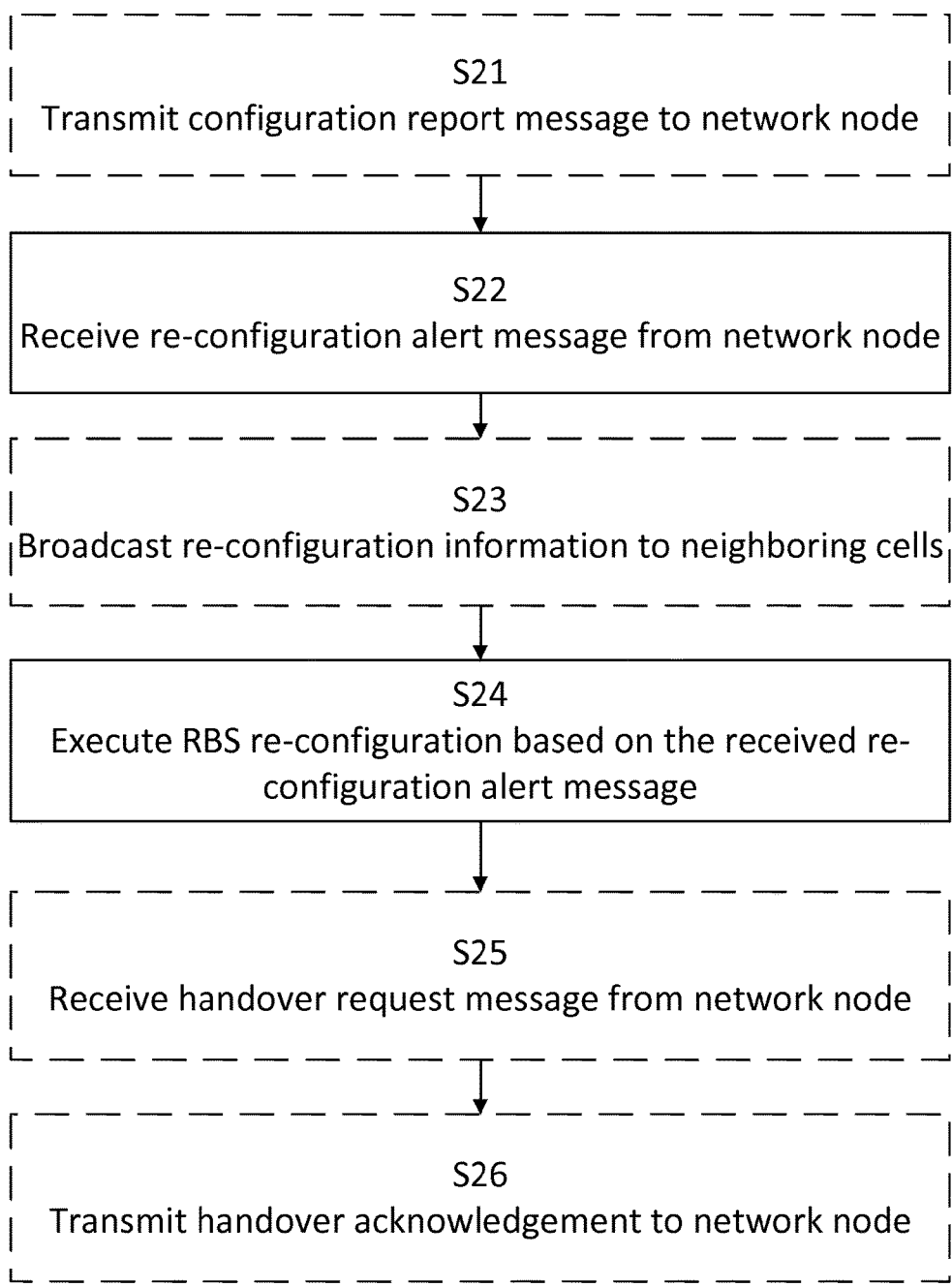

Turning now to FIG. 4, which Figure shows a flowchart illustrating embodiments of method steps in a target radio base station, RBS. In particular, FIG. 4 shows a method performed in a target RBS 203 for triggering a performance level re-configuration of the target RBS 203. The method comprises receiving S22, from a network node, a re-configuration alert message, followed by executing S24 a re-configuration of the target RBS 203 to a higher performance level based on the received re-configuration alert message.

Consequently, the method steps shown in FIG. 4 mirror those shown in FIG. 3 from the point of view of the target RBS 203.

Thus, according to aspects and as discussed in connection to FIG. 3, the re-configuration alert message comprises at least one re-configuration parameter, and the executing S24 is based on the at least one re-configuration parameter.

The target RBS 203, as mentioned above, is according to aspects configured to compare its present performance level configuration to that which is required by the wireless device 202 likely to be handed over to the target RBS 203, and make a decision of whether to initialize a performance level re-configuration or not. Furthermore, in case the wireless device 202 does not require or request the maximum performance level that the RBS can offer, the target RBS 203 does not need to execute a performance level re-configuration up to this maximum performance level, but instead execute a performance level re-configuration up to an intermediate performance level which is enough to provide adequate service to the wireless device 202.

According to some aspects, the method further comprises transmitting S21, to the network node, a configuration report message indicating a present performance level configuration of the target RBS 203. This enables the network node to determine whether it is necessary to execute transmission of the re-configuration alert message, or if the present performance of the target RBS is already at a sufficiently high level in order to properly service the wireless device following handover of the wireless device from the serving RBS 201 to the target RBS 203.

According to aspects, the method further comprises broadcasting S23 re-configuration information related to the coming performance level re-configuration to one or more neighboring cells of the target RBS 203. Since there in some cases is a risk of a temporary negative impact in neighboring cells when a cell increases its performance level, i.e., executes a re-configuration into a higher performance level mode, it is beneficial to implement functionality in the network where a cell indicates a sudden activity change to all its neighboring cells by the above mentioned broadcast. When receiving such information a further RBS is then according to aspects configured to increase the robustness on critical signaling messages such as handover commands. In case an RBS receives information that a neighboring RBS will reduce its performance level in a manner that is expected to reduce the inter-cell interference, a solution where the cell is temporarily more aggressive in the link adaptation will bring additional advantages.

In case an imminent activity increase in the target RBS is expected to cause increased interference in, e.g., the serving RBS, as in the case of removal of MBSFN sub-frames or changing the bandwidth of the target RBS as discussed above, then the serving RBS according to aspects takes precautionary actions to counteract such negative effects. The serving RBS then, according to some aspects, temporarily makes the link adaptation selection a bit more robust then what would otherwise be used.

Also, as shown in FIG. 4, the method according to aspects comprises receiving S25 a handover request from the network node, as well as transmitting S26 a handover acknowledgement to the network node.

Figure 5:
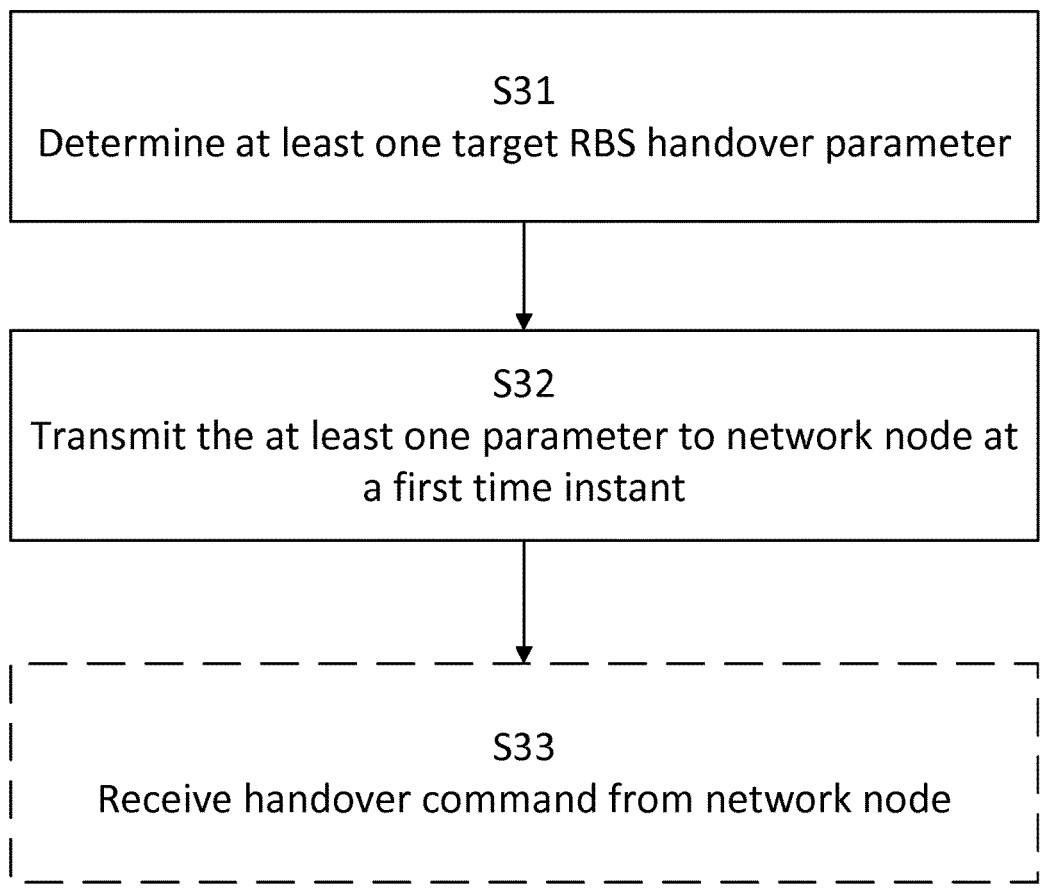

FIG. 5 shows a flowchart illustrating embodiments of method steps in a wireless device 202. In particular, FIG. 5 illustrates a method in a wireless device 202 for supporting a performance level re-configuration of a target radio base station, RBS, 203. The method comprises determining S31 at least one parameter related to the target RBS 203, the at least one parameter indicating if the target RBS is a handover candidate for the wireless device 202.

Then, if the target RBS 203 is determined to be a handover candidate for the wireless device, the method comprises transmitting S32 the at least one parameter to a network node at a first time instant, the first time instant occurring earlier than a corresponding time instant of a regular handover routine.

Thus, by the feature of executing the transmitting at a first time instant, the first time instant occurring earlier than a corresponding time instant of a regular handover routine, the present teaching of triggering an early performance level re-configuration in a target RBS 203 is enabled. In this way, the impact on the wireless device 202 by the re-configuration penalty is reduced.

According to some aspects, the first time instant is determined based on a service category classification of the wireless device 202. Thus, different wireless devices are handled differently according to aspects of the present teaching. For instance, a wireless device requiring a high data rate service will trigger transmission of a re-configuration alert message earlier than a low data rate wireless device.

This first time instant is determined based on any of:
A required throughput of the wireless device 202.
A required maximum transmission delay of the wireless device 202.
A required priority of the wireless device 202.
A required maximum transmission error rate of the wireless device 202.

Further, according to aspects, the at least one parameter comprises any of:
A reference signal received power, RSRP, value, indicating a quality of a radio link between the wireless device 202 and the target RBS 203.
A reference signal received quality, RSRQ, value, indicating a quality of a radio link between the wireless device 202 and the target RBS 203.
A first distance value 208 indicating the geographical distance between the wireless device 202 and the target RBS 203.
A second distance value 209 indicating the geographical distance between the wireless device 202 and a cell border 205 between a cell 206 of a serving RBS 201 of the wireless device and a cell 207 of the target RBS 203.

According to some aspects, the method further comprising receiving S33 a handover command from the network node.

It is to be understood that the methods, including aspects, disclosed herein can be implemented in a wide variety of ways. One way being by a computer program comprising computer program code which, when executed in a network node, a target RBS, or a wireless device, causes the network node, the target RBS, and/or the wireless device to execute the methods disclosed herein.

Thus, the various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Figure 6:
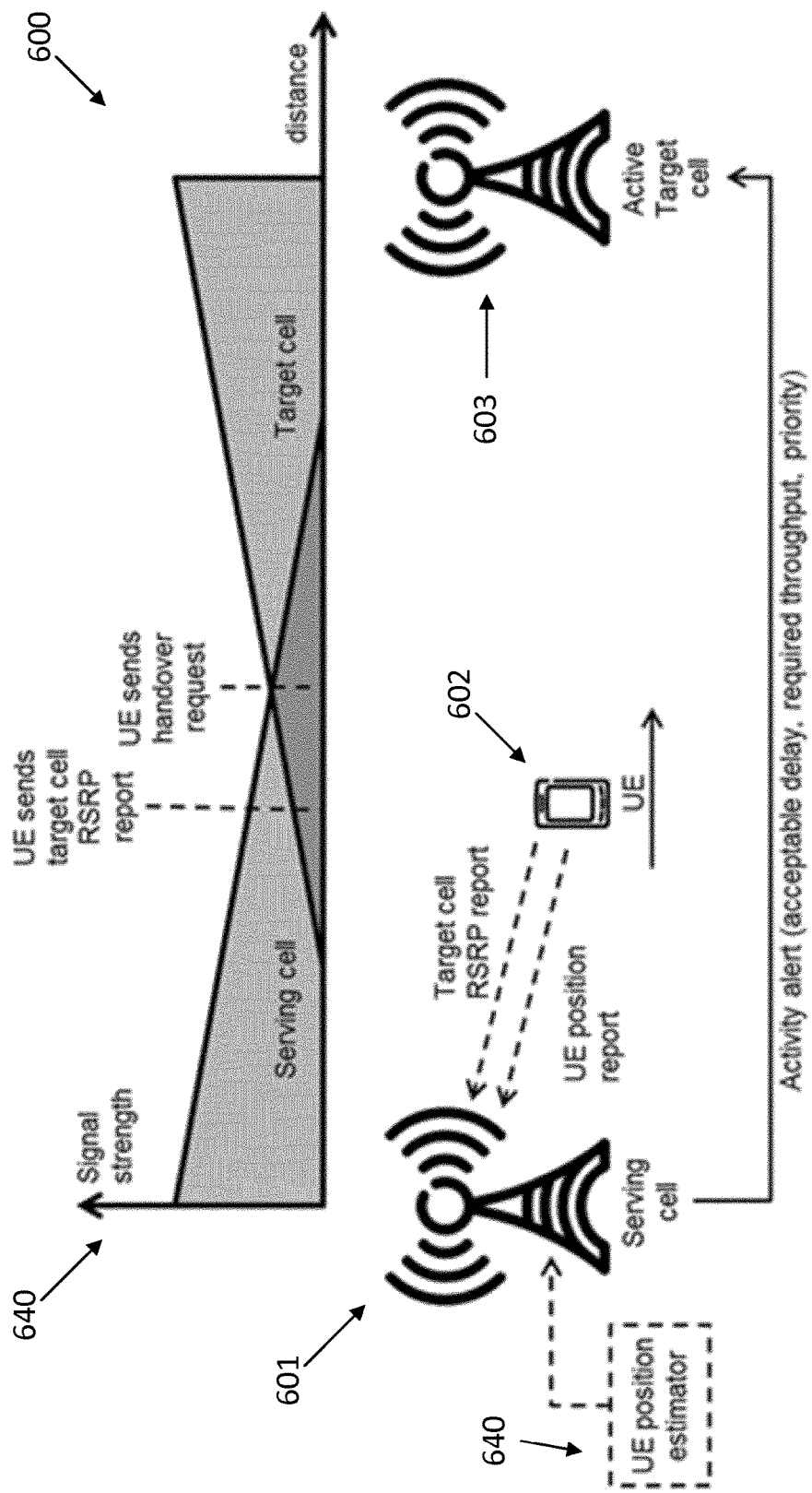
FIG. 6 is a schematic illustration of a radio network.

FIG. 6 shows a schematic illustration of a radio network 600. The serving RBS 601 is here shown as a serving cell, which serving cell comprises an optional user equipment, UE, position estimator 640 for determining the geographical position of the wireless device 602, here shown as a UE. As the wireless device moves closer to the target RBS 603, here shown as an active target cell, the UE optionally transmits data to the serving RBS 601, including RSRP values and potentially also position reports.

At some point in time, the serving RBS 601, which is here acting as the network node of the present teaching, transmits the re-configuration alert message to the target RBS 603. In FIG. 6, the re-configuration alert message is shown to comprise acceptable delay, required throughput, and the priority of the wireless device 602 about to be handed over to the target RBS 603.

There is further shown in FIG. 6 a signal strength diagram 641, which illustrates some aspects of the transmissions by the wireless device 602. In particular there is illustrated the above mentioned feature of executing the transmitting at a first time instant, the first time instant occurring earlier than a corresponding time instant of a regular handover routine, whereby the present teaching of triggering an early performance level re-configuration in a target RBS 203 is enabled.

Figure 7:
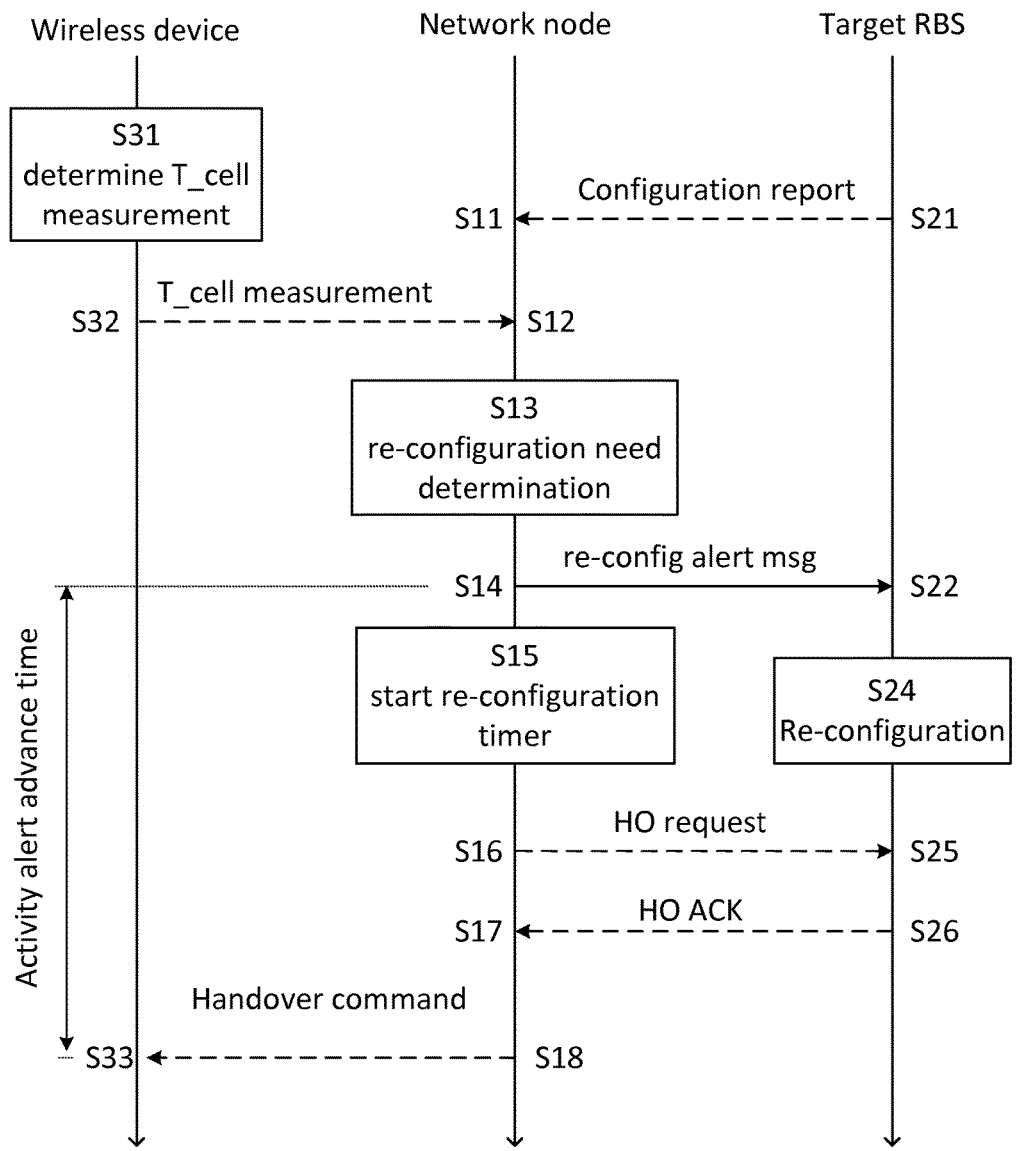
FIG. 7 is a signaling diagram illustrating signal exchange in a radio network.

FIG. 7 is a signaling diagram illustrating signal exchange in a radio network according to aspects of the present technique. The signaling diagram shows signaling for triggering of performance level re-configuration in a target RBS, such as the target RBS 203, 603 shown in FIGS. 2 and 6. In particular, the interaction between the disclosed methods are shown, i.e., the method in a network node, the method in a target RBS, and the method in a wireless device. Thus, reference signs for method steps in FIGS. 3-5 are included in FIG. 7. Dashed lines indicate optional signaling.

The wireless device optionally first determines, S31, the at least one parameter related to the target RBS, shown in FIG. 7 as T_cell measurement. The wireless device then transmits, S32, data (T_cell measurement) to the network node. This data, according to aspects, comprises any of an RSRP value, and RSRQ value, or position data.

The target RBS optionally transmits, S21, a configuration report to the network node.

The network node then determines, S13, if a need for performance level re-configuration in the target RBS 203 exists, and, if so, proceeds to transmit, S14, a re-configuration alert message to the target RBS according to the present teaching. This re-configuration alert message may trigger a re-configuration routine, S24, in the target RBS 203.

Optionally, the network node then starts, S15, a re-configuration timer corresponding to a re-configuration time duration of the target RBS 203, and transmits, S16, to the target RBS 203, a handover request message for handover of the wireless device 202 to the target RBS 203, following expiration of the re-configuration timer. This handover request is then acknowledged, S26, by the target RBS following which a handover command is transmitted, S18, to the wireless device from the network node.

It is seen from FIG. 7 that as long as the activity alert advance time exceeds the time to re-configure the performance level of the target RBS, then there will be no impact from the re-configuration penalty on the operation of the wireless device 202.

Figure 8:
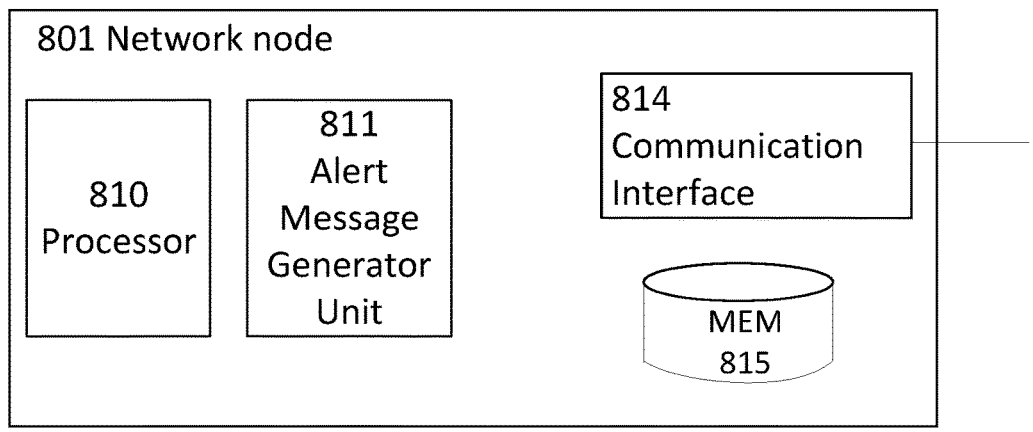
FIG. 8 is a block diagram illustrating an embodiment of a network node.

Turning now to FIG. 8, which shows a network node 801 of the present technique adapted to trigger re-configuration of the performance level of a target radio base station, RBS, 203 prior to handover of a wireless device 202 to the target RBS 203. The network node 801 comprises a processor 810 configured to determine if a need for performance level re-configuration in the target RBS 203 exists, an alert message generator unit 811 configured to, if a need for performance level re-configuration in the target RBS 203, exists, generate a re-configuration alert message, and a communication interface 814 configured to transmit the re-configuration alert message to the target RBS 203, thereby triggering re-configuration of the performance level of the target RBS 203.

Thus, the network node 801 is adapted to implement and/or execute the method discussed in connection to FIGS. 3 and 7.

Figure 9:
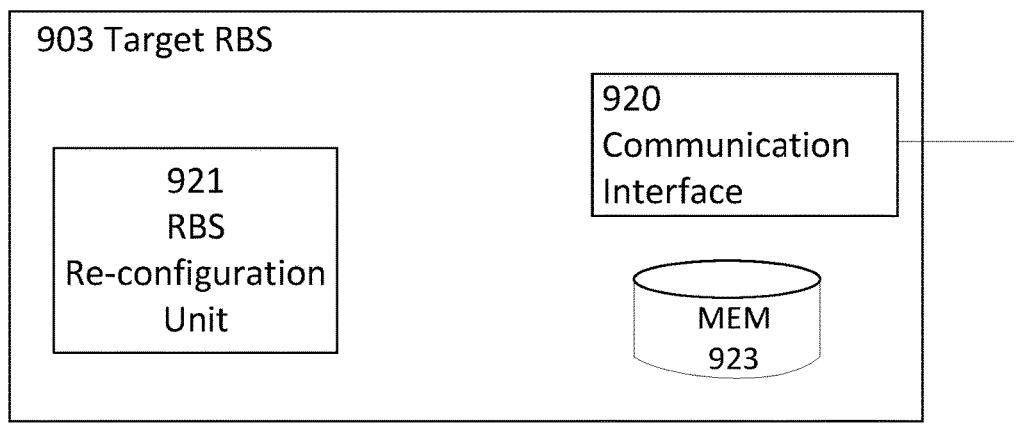
FIG. 9 is a block diagram illustrating an embodiment of a target RBS.

FIG. 9 shows a target radio base station, RBS, 903 of the present technique supporting performance level re-configuration. The target RBS 903 comprises a communication interface 920 configured to receive, from a network node, a re-configuration alert message, and an RBS re-configuration unit 921 configured to trigger a performance level re-configuration to a higher performance level of the target RBS 903 based on the received re-configuration alert message.

Thus, the target RBS 903 is adapted to implement and/or execute the method discussed in connection to FIGS. 4 and 7.

Figure 10:
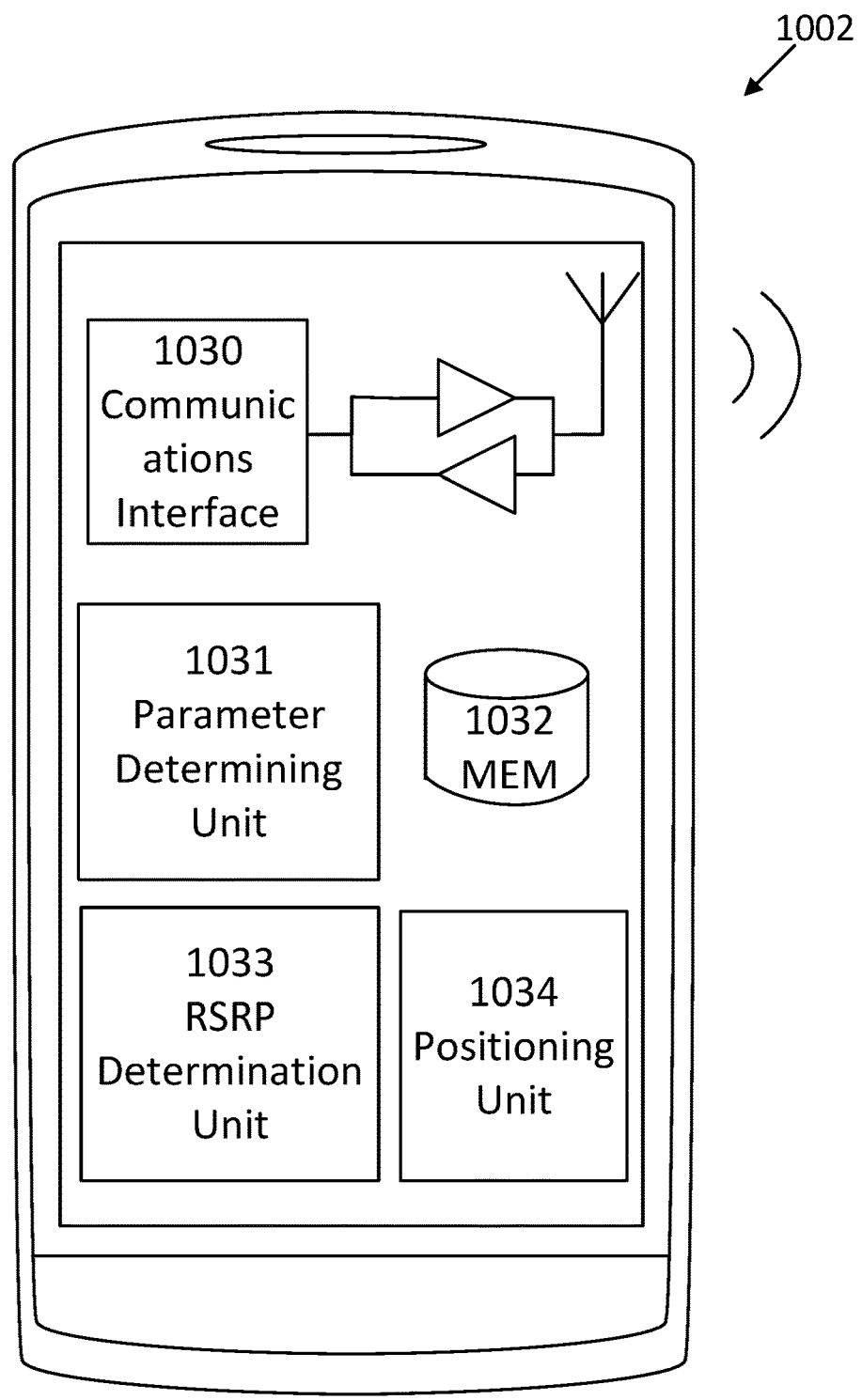
FIG. 10 is a block diagram illustrating an embodiment of a wireless device.

FIG. 10 shows a wireless device 1002 configured for supporting performance level re-configuration of a target radio base station, RBS, 203. The wireless device 1002 comprises a parameter determining unit 1031 configured to determine at least one parameter related to the target RBS 203, the at least one parameter indicating if the target RBS is a handover candidate for the wireless device 1002. The wireless device also comprises a communications interface 1030 adapted to transmit the at least one parameter to a network node at a first time instant earlier than a corresponding time instant of a regular handover routine.

According to aspects, the wireless device 1002 further comprises a reference signal received power, RSRP, determination unit 1033 configured to determine an RSRP value of a radio link between the wireless device 1002 and the target RBS 203. The parameter determining unit 1031 is adapted to compare the determined RSRP value to an RSRP threshold value determined based on a service category classification of the wireless device 1002, and to transmit the determined RSRP value to the network node via the communications interface 2030 in case the determined RSRP value exceeds the RSRP threshold value.

According to some further aspects, the RSRP threshold value is set based on any one of a required throughput of the wireless device, a required maximum transmission delay of the wireless device, a required priority of the wireless device, and a required maximum transmission error rate of the wireless device.

According to aspects, the wireless device further comprises a positioning module 1034 adapted to determine a first distance value 208 indicating the geographical distance between the wireless device and the target RBS 203, and to transmit the first distance value 208 to the network node via the communications interface 1030.

According to aspects, the positioning module 1034 is further adapted to determine a second distance value 209 indicating the geographical distance between the wireless device 202 and a cell border 205 between a cell 206 of the serving RBS 201 of the wireless device and a cell 207 of the target RBS 203, and to transmit the second distance value 209 to the network node via the communications interface 1030.

Thus, the wireless device 1002 shown in FIG. 10 is, according to aspects, adapted to implement and/or execute aspects of the method discussed in connection to FIGS. 5 and 7.

Figure 11:
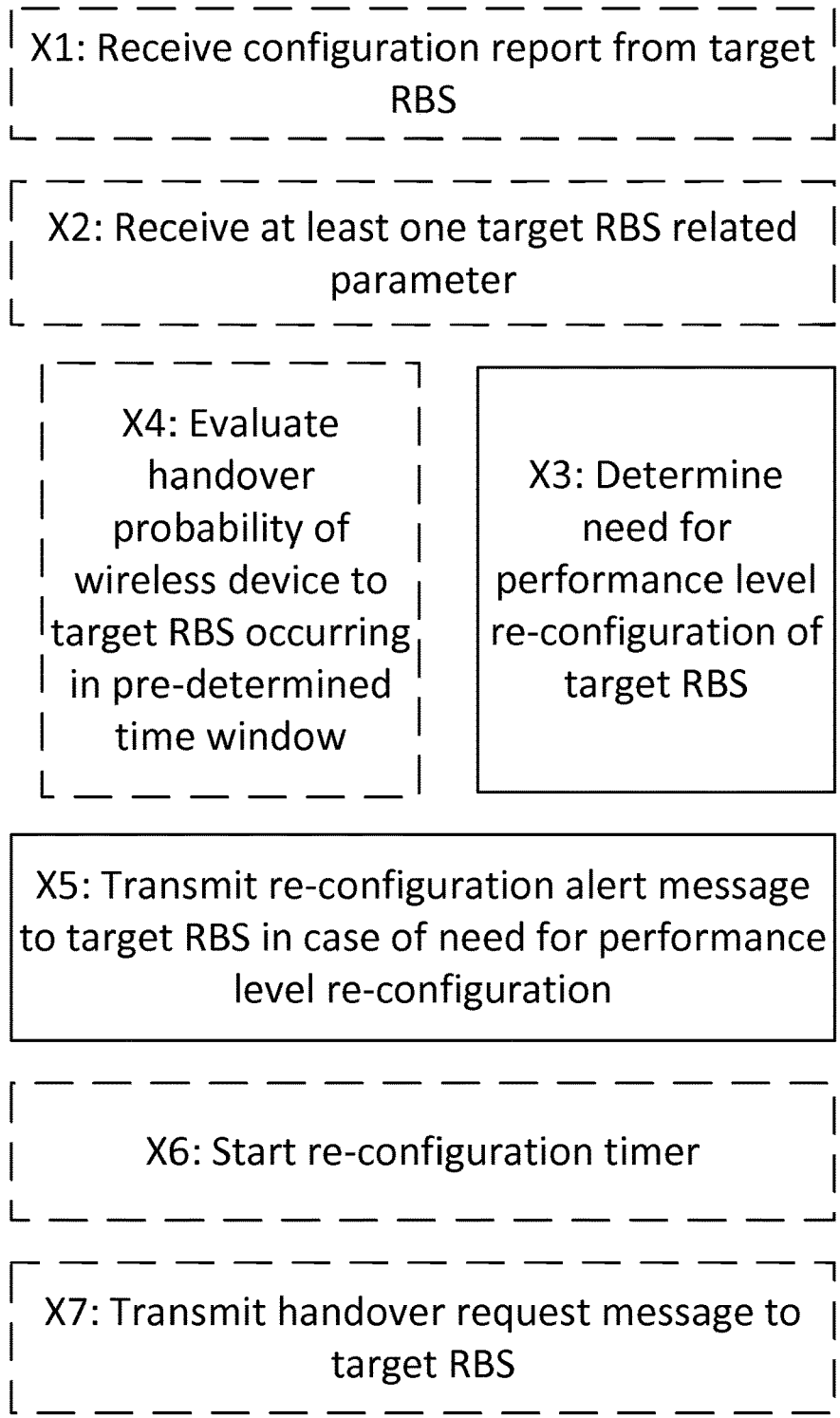
FIG. 11 is a schematic illustration of a network node.

FIG. 11 shows a network node for triggering a performance level re-configuration in a target radio base station, RBS, 203 prior to handover of a wireless device 202 to the target RBS 203, comprising:
a first optional module, X1, configured to receive a configuration report from the target RBS, a second optional module, X2, configured to receive at least one target RBS related parameter, a third module, X3, configured to determine if a need for performance level re-configuration of the target RBS 203 exists, a fourth optional module, X4, configured to evaluate a handover probability of the wireless device to target RBS occurring in a pre-determined time window, a fifth module, X5, configured to, if need for performance level re-configuration of the target RBS 203 exists, transmit, to the target RBS 203, a re-configuration alert message, thereby enabling a performance level re-configuration in the target RBS 203 prior to handover of the wireless device 202 to the target RBS 203, a sixth optional module, X6, configured to start a re-configuration timer corresponding to a re-configuration time duration of the target RBS 203, a seventh optional module, X7, configured to transmit, to the target RBS 203, a handover request message for handover of the wireless device 202 to the target RBS 203, following expiration of the re-configuration timer.

The invention claimed is:

1. A method performed in a network node for triggering a performance level re-configuration in a target radio base station, RBS, prior to handover of a wireless device to the target RBS, the method comprising:
   determining whether there is a need for performance level re-configuration of the target RBS, wherein the determining comprises: (i) determining a probability that the handover of the wireless device to the target RBS will occur within a pre-determined re-configuration time duration and (2) determining whether the probability exceeds a pre-determined probability threshold;
   as a result of determining that there is a need for performance level re-configuration of the target RBS, generating a re-configuration alert message;
   transmitting, to the target RBS, the re-configuration alert message such that a performance level re-configuration in the target RBS is enabled prior to handover of the wireless device to the target RBS, wherein the re-configuration alert message further comprises a configuration report of a serving RBS of the wireless device indicating a performance level of the serving RBS upon handover completion;
   starting a re-configuration timer corresponding to a re-configuration time duration of the target RBS; and
   transmitting, to the target RBS, a handover request message for handover of the wireless device to the target RBS, following expiration of the re-configuration timer.

2. The method according to claim 1, further comprising:
   receiving, from the wireless device, at least one parameter related to the target RBS indicating that the target RBS is a handover candidate of the wireless device, and wherein
   the determining whether there is a need for performance level re-configuration of the target RBS is based on the received at least one parameter.

3. The method according to claim 2, wherein the at least one parameter related to the target RBS comprises any of:
   a reference signal received power, RSRP, value indicating a quality of a radio link between the wireless device and the target RBS;
   a reference signal received quality, RSRQ, value indicating a quality of a radio link between the wireless device and the target RBS;
   a first distance value indicating the geographical distance between the wireless device and the target RBS; and
   a second distance value indicating the geographical distance between the wireless device and a cell border between a cell of a serving RBS of the wireless device and a cell of the target RBS.

4. The method according to claim 3, wherein determining whether the probability exceeds the pre-determined probability threshold comprises:
   comparing the first distance value to a predetermined first distance threshold;
   comparing the second distance value to a predetermined second distance threshold;
   determining whether the first distance value exceeds the predetermined first distance threshold; and
   determining whether the second distance value exceeds the predetermined second distance threshold.

5. The method according to claim 1, further comprising receiving, from the target RBS, a configuration report indicating a present performance level configuration of the target RBS, and wherein the transmitting further comprises transmitting, to the target RBS, the re-configuration alert message if the target RBS is operating below a maximum performance level.

6. The method according to claim 1, wherein the re-configuration alert message comprises any of:
   a required throughput of the wireless device;
   a required maximum transmission delay of the wireless device;
   a required priority of the wireless device; and
   a required maximum transmission error rate of the wireless device.

7. A computer program stored on a non-transitory medium comprising computer program code which, when executed in a network node, causes the network node to execute the method according to claim 1.

8. A network node adapted to trigger re-configuration of the performance level of a target radio base station, RBS, prior to handover of a wireless device to the target RBS, the network node comprising:
   a communication interface;
   memory; and
   a processor coupled to the memory and the communication interface, the processor configured to:
   determine whether there is a need for performance level re-configuration of the target RBS, wherein the determining comprises: (i) determining a probability that the handover of the wireless device to the target RBS will occur within a pre-determined re-configuration time duration and (2) determining whether the probability exceeds a pre-determined probability threshold;
   as a result of determining that there is a need for performance level re-configuration of the target RBS, generate a re-configuration alert message;
   employ the communication interface to transmit, to the target RBS, the re-configuration alert message such that a performance level re-configuration in the target RBS is enabled prior to handover of the wireless device to the target RBS, wherein the re-configuration alert message further comprises a configuration report of a serving RBS of the wireless device indicating a performance level of the serving RBS upon handover completion;
   start a re-configuration timer corresponding to a re-configuration time duration of the target RBS; and transmit, to the target RBS, a handover request message for handover of the wireless device to the target RBS, following expiration of the re-configuration timer.

9. The network node according to claim 8, wherein the network node is a serving RBS of the wireless device.

10. The network node according to claim 8, wherein the network node is a central network control entity of a radio network comprising the wireless device, the target RBS, and a serving RBS of the wireless device.

11. The network node according to claim 8, wherein the network node is a module comprised in the wireless device.

* * * * *